(No Model.)
O. W. NORCROSS.
SAW FOR CUTTING STONE.
No. 511,965. Patented Jan. 2, 1894.
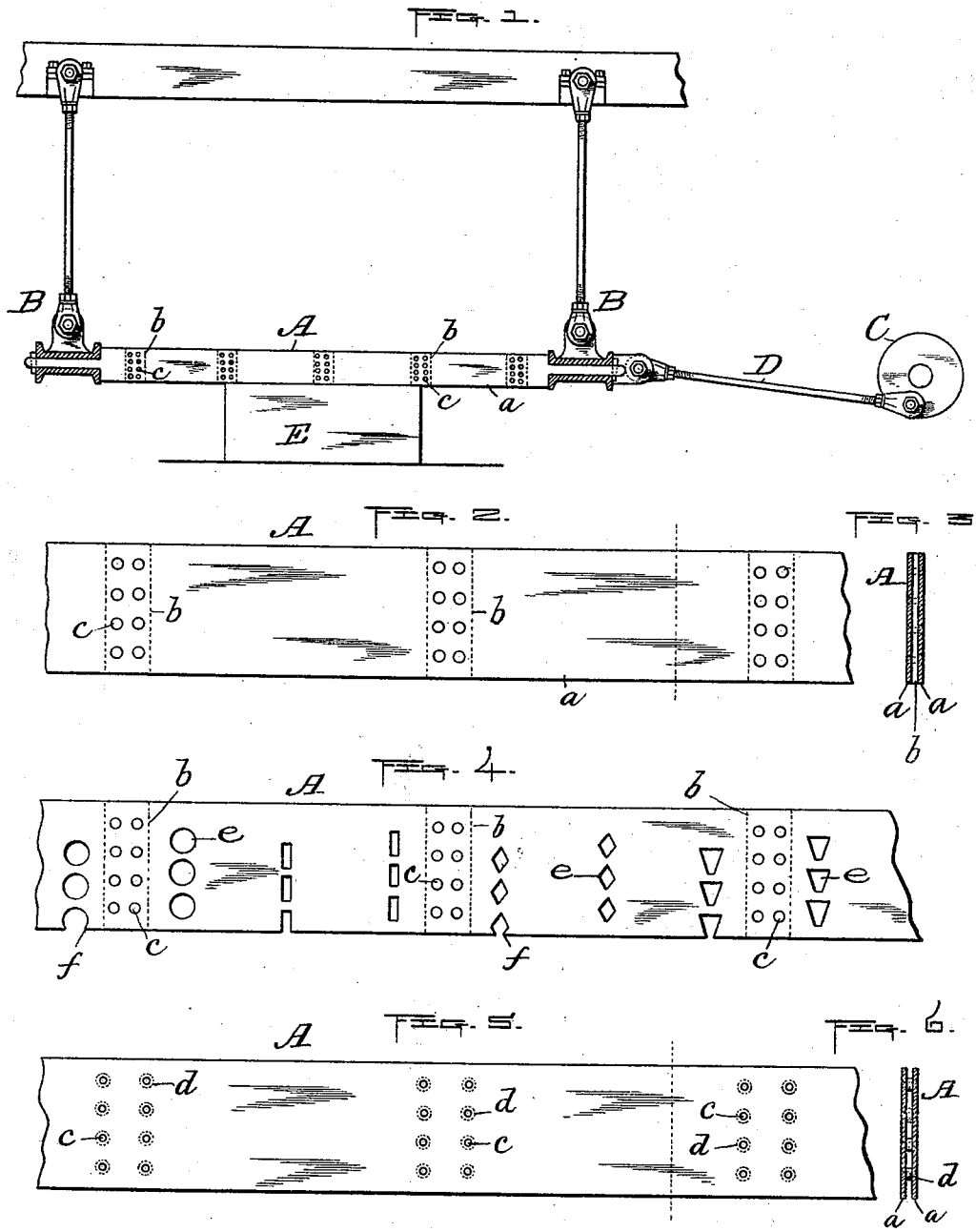

UNITED STATES PATENT OFFICE.

ORLANDO W. NORCROSS, OF WORCESTER, MASSACHUSETTS.

SAW FOR CUTTING STONE.

SPECIFICATION forming part of Letters Patent No. 511,965, dated January 2, 1894.

Application filed April 26, 1893. Serial No. 471,858. (No model.)

*To all whom it may concern:*

Be it known that I, ORLANDO W. NORCROSS, of the city and county of Worcester and State of Massachusetts, have invented certain new and useful Improvements in Saws for Cutting Stone; and I do hereby declare that the following is a full, clear, and exact description thereof, reference being had to the accompanying drawings, forming a part of this specification, and in which—

Figure 1 represents a side view, partly in section, of so much of a stone-sawing machine as is necessary to illustrate the nature and purpose of my invention, the saw being shown resting upon a block of stone, preparatory to cutting into the same. Fig. 2 is an enlarged view of part of the saw shown in Fig. 1. Fig. 3 is a transverse section therethrough. Figs. 4 and 5 are similar views to Fig. 2, showing modifications in the construction of the saw which will be hereinafter described, and Fig. 6 is a transverse section of the saw shown in Fig. 5.

The object of my invention is to provide a saw for stone-sawing machines whereby the stone may be cut more rapidly than by the present methods, and consists of double parallel blades, made and attached together, at a short distance apart, as and for the purpose hereinafter more fully set forth.

In order that others may better understand the nature and purpose of my said invention, I will now proceed to describe it more in detail.

In the drawings, A represents the saw which may be mounted in a stone-sawing machine, in the usual way. As said machine constitutes no part of my invention, aside from the saws, I have illustrated in the drawings, only the swinging frame B, which supports said saws, and one of the usual eccentrics C, and its rod D, connected with said swinging frame,—the usual vertical, feed-mechanism connected with the supporting frame, and the driving mechanism connected with the eccentrics not being shown.

Several saws with their eccentrics and rods, it will be understood, are, in practice, used upon one machine, so as to cut a block of stone, as E, into several parts at one operation.

In carrying out my invention I make each of the saws A, of two metal strips or blades, $a, a$, fastened at a short distance apart in any suitable way, parallel to each other, or substantially so,—leaving just sufficient space between them to permit water, sand, chilled shot, chilled iron, crushed steel, or other suitable material used in sawing, (to facilitate the operation of cutting) to freely pass down between them to the bottom of said blades, thereby insuring a suitable and constant supply of water and said cutting material around the cutting edges of the saw; which, as will at once be apparent, causes the stone to be cut away very rapidly, much more so than by any of the present methods of stone sawing.

By using two blades with a space between them, as aforesaid, the saw is also not so liable to become clogged in operation, as by the old form of saws used for this purpose, and the slight body of stock between said blades, which crumbles and breaks down as fast as the blades of the saw cut away the stock at each side thereof, and which works down under the blades, tends to facilitate the cutting operation, in addition to the special cutting material usually employed, as aforesaid.

Various ways may be adopted for fastening the blades $a$, $a$ together, and I therefore do not limit myself to any special method.

In all but the last two figures of the drawings, I have shown said blades as being held apart by flat strips $b$, laid transversely between the same, and fastened by rivets or screws $c$ passed transversely through said blades and strips; while in Figs. 5 and 6 I have shown, in place of the strips $b$, separating rings or ferrules $d$, through which said rivets or screws are passed to fasten the parts together as aforesaid.

If desired the blades $a$ $a$ may be provided with transverse perforations or openings; (see Fig. 4) of any desired shape or size, to facilitate the operation of cutting, without departing from the principle of my invention. In said Fig. 4 I have shown various shapes of openings, as an illustration thereof. Said openings are, in practice, preferably arranged out of line longitudinally, so that as the saw is worn down, and the stock at each side of one set of openings passes out of use, another will come into use, and thus constantly provide a new set of cutting edges, without materially weakening the saw. Said perforations, however, not constituting an essential feature to this invention, I reserve the right to use the same or not, as desired.

Having now described my invention, what I claim as new, and desire to secure by Letters Patent, is—

1. An improved saw for stone cutting machines, consisting of two parallel blades arranged at a short distance apart, suitable separators interposed between said blades, and means for fastening the blades together, substantially as and for the purpose set forth.

2. An improved saw for stone-cutting machines, consisting of two parallel blades arranged at a short distance apart, and having transverse openings therein as described, suitable separators interposed between said blades, and means for fastening the blades together, substantially as and for the purpose set forth.

ORLANDO W. NORCROSS.

Witnesses:
ALBERT J. PARK,
CHAS. A. EARLE.